United States Patent

Cip et al.

[11] Patent Number: 5,855,643
[45] Date of Patent: Jan. 5, 1999

[54] DIRECT REDUCTION PROCESS FOR IRON OXIDE-CONTAINING MATERIALS

[75] Inventors: Gerhard Cip, Linz; Konstantin Milionis, St. Georgen an der Stiefling; Sadat Morteza Guscheh, Linz, all of Austria; Roy Hubert Whipp, Jr., Windermere, Fla.

[73] Assignee: Voest-Alpine Industrieanlagenbau GmbH, Linz, Austria

[21] Appl. No.: 765,339

[22] PCT Filed: Jun. 20, 1995

[86] PCT No.: PCT/AT95/00122

§ 371 Date: Jan. 15, 1997

§ 102(e) Date: Jan. 15, 1997

[87] PCT Pub. No.: WO96/00303

PCT Pub. Date: Jan. 4, 1996

[30] Foreign Application Priority Data

Jun. 23, 1994 [AT] Austria .................................. 1249/94

[51] Int. Cl.⁶ .................................................. C21B 13/00
[52] U.S. Cl. .............................. 75/380; 75/450; 75/505; 48/198.3; 266/156; 266/172
[58] Field of Search ............................... 75/489, 490, 496, 75/505, 444, 450, 495, 498, 380; 266/78, 156, 172; 48/198.3

[56] References Cited

U.S. PATENT DOCUMENTS 2,752,234  6/1956  Shipley .
3,844,766  10/1974  Beggs ......................................... 75/490
4,150,972  4/1979  Price-Falcon et al. .
4,880,459  11/1989  Coyne, Jr. .
5,082,251  1/1992  Whipp .
5,370,727  12/1994  Whipp ....................................... 75/450

FOREIGN PATENT DOCUMENTS 428098   5/1991   European Pat. Off. .
571358   11/1993  European Pat. Off. .
975404   3/1951   France .
799551   8/1958   United Kingdom .

*Primary Examiner*—Melvyn Andrews
*Attorney, Agent, or Firm*—Ostrolenk, Faber, Gerb & Soffen, LLP

[57] ABSTRACT

In a process for the direct reduction of iron-oxide containing material, synthesis gas is mixed with top gas formed in the direct reduction of the iron-oxide containing material and is used as a reducing gas for direct reduction. In order to avoid metal dusting despite an elevated CO-content of the reducing gas, or to reduce metal dusting, in a procedurally simple and cost-saving manner while minimizing the energy demand, an $H_2O$ content of between 1 and 2%, preferably amounting to about 1.5%, is achieved in the reducing gas by subjecting a partial volume of the top gas to $CO_2$ scrubbing prior to being used as a reducing gas, wherein the top gas subjected to $CO_2$ scrubbing is mixed with the synthesis gas, is brought to a predetermined temperature by direct water irrigation while being saturated with $H_2O$, after direct water irrigation is heated to a temperature above the saturation temperature by admixing $CO_2$-unscrubbed top gas, and subsequently is used as a reducing gas.

23 Claims, 2 Drawing Sheets

DIRECT REDUCTION PROCESS FOR IRON OXIDE-CONTAINING MATERIALS

BACKGROUND OF THE INVENTION

1. Field of the Invention

The present invention relates to a process for the direct reduction of iron-containing material, wherein synthesis gas, preferably reformed natural gas, is mixed with top gas forming in the direct reduction of the iron-containing material and is used for direct reduction as a reducing gas which does not crack at reduction temperature, as well as a plant for carrying out the process.

2. Description of the Prior Art

A process of this type is known, for instance, from U.S. Pat. No. 2,752,234, U.S. Pat. No. 5,081,251, and EP 0 571 358.

From EP 0 571 358 it is known to carry out the reduction of fine ore not exclusively via the strongly endothermic reaction with $H_2$ according to $$Fe_2O_3 + 3H_2 = 2 Fe + 3H_2O - \Delta H,$$

but additionally via the reaction with CO according to $$Fe_2O_3 + 3CO = 2 Fe + 3CO_2 - \Delta H,$$

which is an exothermic reaction. Thereby, it is feasible to considerably lower the operational costs involved.

However, in metallic plant parts that get into contact with CO-containing reducing gas are subject to a high stress due to corrosion. The result is metal decomposition, which is denoted as "metal dusting" in the technical literature. Metal dusting occurs to an increased extent at elevated temperatures, plant parts that get into contact with hot CO-containing reducing gas, thus, being particularly jeopardized. With a plant for carrying out the initially mentioned process, these are primarily the reactors employed for direct reduction and the gas heater heating the reducing gas to reduction temperature.

With a process according to the prior art, difficulties may occur when the reducing gas has a water content that is either too high or too low. If the water content is too high, the reduction potential of the reducing gas decreases. As a result, a higher amount of reducing gas is required for direct reduction than would actually be necessary in accordance with the chemical potential of the reducing gas. A further difficulty arises if the water content of the reducing gas is too low, because too dry a reducing gas causes metal dusting to an increased extent. In order to minimize both of these drawbacks, it is necessary to adjust the optimum water content with great accuracy.

SUMMARY OF THE INVENTION

The invention aims at avoiding these disadvantages and difficulties and has as its object to provide a process of the kind initially desired, and a plant for carrying out the process by which the occurrence of metal dusting is minimized or prevented in a simple manner despite an elevated CO content of the reducing gas. The goal is achieved in a procedurally and structurally simple and cost-saving manner, so that the service life of metallic plant parts will be considerably increased while utilizing the chemical reduction potential of the reducing gas to the optimum degree. Thereby, the energy demand, particularly the demand of reducing gas, is to be minimized.

In accordance with the invention, the object is achieved in that an $H_2O$ content of between 1 and 2 Vol. %, preferably amounting to about 1.5 Vol. %, is adjusted in the reducing gas by subjecting a partial volume of the top gas to $CO_2$ scrubbing prior to being used as a reducing gas, wherein the top gas subjected to $CO_2$ scrubbing is mixed with the synthesis gas and is brought to a predetermined temperature by direct irrigation while being saturated with $H_2O$. After direct irrigation, the gas is heated to a temperature above the saturation temperature by admixing $CO_2$-unscrubbed top gas, and subsequently is used as a reducing gas.

By directly cooling or directly heating by means of irrigation the top gas subjected to $CO_2$ scrubbing and the admixed synthesis gas to a predetermined temperature, it is feasible to saturate this gas mixture with water, the temperature being chosen as a function of the desired water content. By adjusting a given temperature of the reducing gas, which is very simple to realize in terms of control and accuracy without great expenditure, it is feasible, to adjust the water content in the reducing gas with very high accuracy, i.e., at a substantially higher accuracy level than is achieved, for instance, by blowing in a vapor through tuyeres or by taking other measures.

In order to avoid condensate formation by the reducing gas leaving the direct cooler in the saturated state—such condensate formation would induce the formation of sulfurous acid in gas-containing tubes which would result in pitting—the temperature of the reducing gas is increased to a temperature above the saturation temperature.

It is known from the prior art cited in the introductory part that reducing gases have an $H_2O$ content of about 1.5 Vol. %. Yet none of the prior art documents dealt with hereinabove has ever considered the adjustment of an $H_2O$ content to a predetermined value with high accuracy or the way in which a predetermined $H_2O$ content may be obtained in the reducing gas.

From French Patent No. 975 404 it is known to treat iron oxide in a reduction zone at a temperature of between 750° C. ad 900° C., namely by a reducing gas consisting predominantly of hydrogen and a carbon-containing gas and which in the presence of the iron oxide can be cracked at the foregoing temperatures, so that carbon deposits on the iron oxide. Herein, the amount of carbon deposited on the iron oxide is regulated by effecting the deoxidation of the iron oxide in the presence of an amount of roughly 32 to 160 g water vapor per ml gas.

Preferably, reformed natural gas is employed as the synthesis gas and the reformed natural gas is subjected to $CO_2$ scrubbing prior to being used as a reducing gas, wherein a partial volume of the reformed natural gas not subjected to $CO_2$ scrubbing, together with the top gas subjected to $CO_2$ scrubbing, is subject to direct irrigation.

Suitably, a partial volume of the top gas not subjected to $CO_2$ scrubbing together with the top gas subjected to $CO_2$ scrubbing, is subject to direct irrigation.

By the two last described measures, it is feasible to guarantee a predetermined $CO_2$ content in the reducing gas or a predetermined $CO/CO_2$ ratio in the reducing gas, respectively, thus further minimizing the risk of metal dusting.

A preferred embodiment for the direct reduction of iron-containing material, wherein synthesis gas, preferably reformed natural gas, is mixed with top gas forming in the direct reduction of the iron-containing material and is used for direct reduction as a reducing gas which does not crack at reduction temperature, is characterized in that an $H_2O$ content of between 1 and 2 Vol. %, preferably amounting to about 1.5 Vol. %, is achieved in the reducing gas by mixing the top gas subjected to $CO_2$ scrubbing with the synthesis gas, directly bringing the same to a predetermined temperature while enriching it with $H_2O$, subsequently subjecting it to mist collection and finally using it as a reducing gas.

In doing so, mist collection is provided after irrigation in order to avoid the formation of sulfurous acid such that any condensate forming will be eliminated from the reducing gas.

Another preferred embodiment for the direct reduction of iron-containing material, wherein synthesis gas, preferably reformed natural gas, is mixed with top gas forming in the direct reduction of the iron-containing material and is used for direct reduction as a reducing gas which does not crack at reduction temperature. The $H_2O$ content of the reducing gas is between 1 and 2 Vol. %, preferably amounting to about 1.5 Vol. %, and is achieved by subjecting the top gas to $CO_2$ scrubbing prior to being used as a reducing gas and adjusting the temperature control of the $CO_2$ scrubber to obtain the desired $H_2O$ content. In other words, the $H_2O$ content in the gas leaving the $CO_2$ scrubber is dependent on the operation temperature of the $CO_2$ scrubber.

Instead of reformed natural gas, one or several of the following gases may be used as synthesis gas(es):

LD offgas;

EAF offgas;

blast furnace gas from blast furnace plants;

blast furnace gas from Corex plants;

coal gas;

Corex gas from Corex gasifier;

chemical gases.

A plant for carrying out the process, comprising at least one direct reduction reactor for receiving the iron-oxide-containing material and reducing the same, a reducing-gas supply duct leading to said direct reduction reactor and a top-gas discharge duct carrying off the direct reduction reactor the top gas forming in direct reduction, the top-gas discharge duct running into a $CO_2$ scrubber and the reducing gas formed of synthesis gas and of top gas getting into the direct reduction reactor through the reducing-gas supply duct and the reducing-gas supply duct leading from the $CO_2$ scrubber to the direct reduction reactor via a gas heater, is characterized in that the reducing-gas supply duct runs into a direct cooler and from there is further directed to the gas heater, and that the top-gas discharge duct, by means of a bypass duct avoiding the $CO_2$ scrubber, is flow-connected with the reducing-gas supply duct before entry of the latter into the gas heater.

Advantageously, a reformer for reforming natural gas and a reformed-gas duct departing from the reformer and joining the top-gas discharge duct are provided for the production of synthesis gas, both the reformed-gas duct and the top-gas discharge duct running into the $CO_2$ scrubber.

To adjust a preferred $CO_2$ content or a predetermined $CO/CO_2$ ratio in the reducing gas, the reformed-gas duct, by means of a bypass duct avoiding the $CO_2$ scrubber, advantageously is flow-connected with the reducing-gas supply duct before entry of the latter into the direct cooler.

To adjust a preferred $CO_2$ content in the reducing gas, it is further advantageous if the top-gas discharge duct, by means of a bypass duct avoiding the $CO_2$ scrubber, is flow-connected with the reducing gas supply duct before entry of the latter into the direct cooler.

Another preferred embodiment of the plant intended for carrying out the process, comprising at least one direct reduction reactor for receiving the iron-oxide-containing material and reducing the same, a reducing-gas supply duct leading to said direct reduction reactor and a top-gas discharge duct carrying off the direct reduction reactor the top gas forming in direct reduction, the top-gas discharge duct running into a $CO_2$ scrubber and the reducing gas formed of synthesis gas and of top gas getting into the direct reduction reactor through the reducing-gas supply duct and the reducing-gas supply duct leading from the $CO_2$ scrubber to the direct reduction reactor via a gas heater, is characterized in that the reducing-gas supply duct runs into a direct cooler and from there is conducted through a mist collector before entering the gas heater.

Other features and advantages of the present invention will become apparent from the following description of the invention which refers to the accompanying drawings.

BRIEF DESCRIPTION OF THE DRAWINGS

In the following, the invention will be explained in more detail with reference to the following drawings.

DETAILED DESCRIPTION OF THE PREFERRED EMBODIMENT

Figure 1:
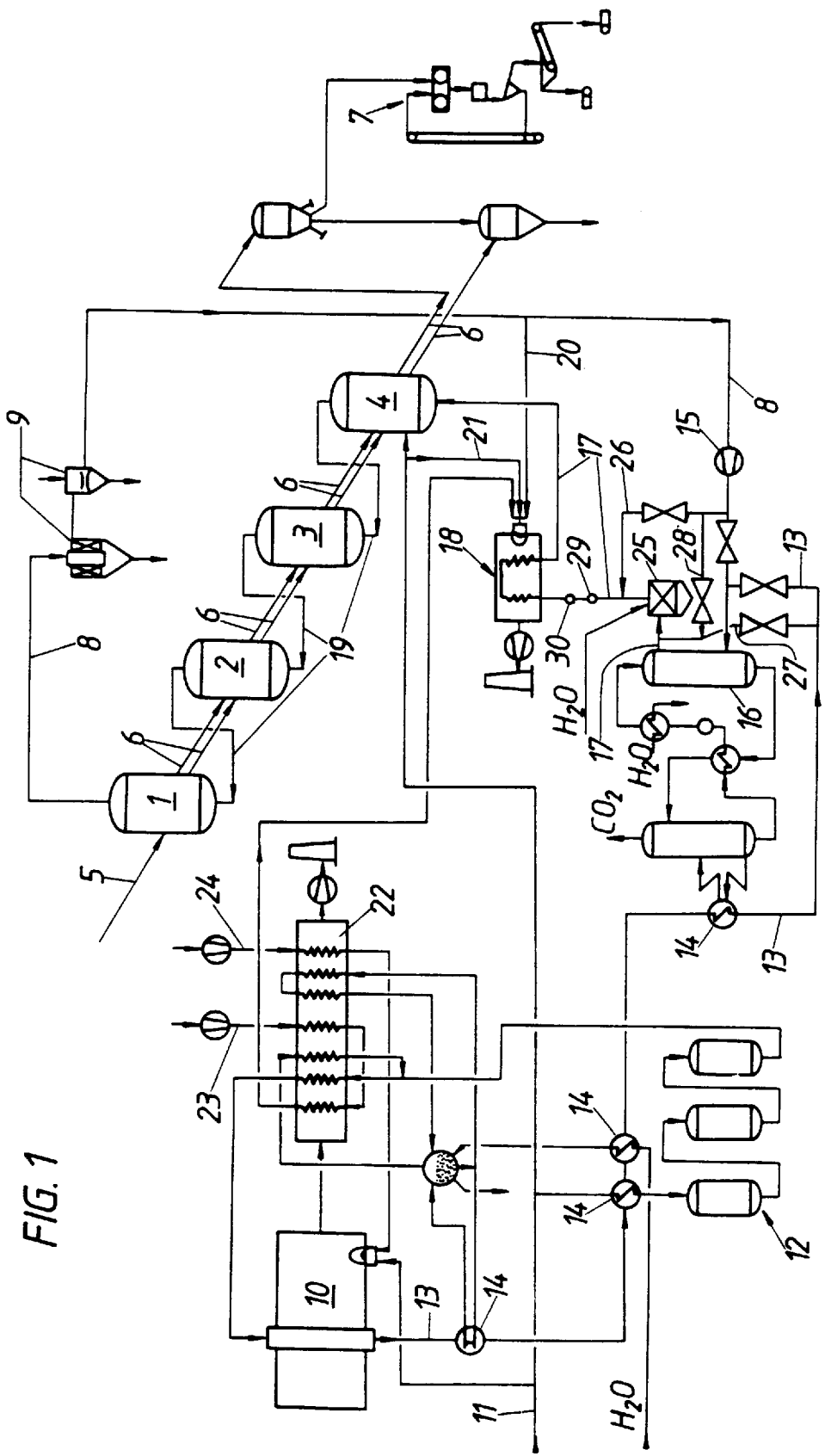
FIG. 1 illustrates a process diagram according to a preferred embodiment of the present invention.

The plant according to the invention, in accordance with FIG. 1, comprises four whirl layer reactors 1 to 4 consecutively connected in series, wherein iron-oxide-containing material, such as fine ore, through an ore supply duct 5 is supplied to the first whirl layer reactor 1, in which heating to reduction temperature (or prereduction) takes place, and subsequently is conducted from one whirl layer reactor to another whirl layer reactor via conveying ducts 6. The completely reduced material (sponge iron) is hot-briquetted in a briquetting arrangement 7. If required, the reduced iron is protected from reoxidation during briquetting by an inert gas system not illustrated.

Prior to introducing the fine ore into the first whirl layer reactor 1, it is subjected to ore preparation, such as drying and sieving, not illustrated in detail.

Reducing gas is conducted in counterflow to the ore flow from one whirl layer reactor 4 to another whirl layer reactor 3 to 1 and is carried off the last whirl layer reactor 1, viewed in the gas flow direction, as a top gas through a top-gas discharge duct 8 and is cooled and scrubbed in a wet scrubber 9.

The production of reducing gas is effected by reforming in a reformer 10 using natural gas fed through a duct 11 and desulfurized in a desulfurization plant 12. The gas leaving the reformer 10 and formed of natural gas and vapor essentially consists of $H_2$, $CO$, $CH_4$, $H_2O$ and $CO_2$. This reformed natural gas is supplied through a reformed-gas duct 13 to several heat exchangers 14, in which it is cooled to 80° to 150° C., water thus being condensed out of the gas.

The reformer-gas duct 13 runs into the top-gas discharge duct 8 after the top gas has been compressed by means of a compressor 15. The mixed gas thus forming is passed through a $CO_2$ scrubber 16 and is freed from $CO_2$ and also from $H_2S$. It is then available as a reducing gas. This reducing gas, via a reducing gas feed duct 17, is heated to a reducing-gas temperature of about 800° C. in a gas heater 18 arranged to follow the $CO_2$ scrubber 16 and is fed to the first whirl layer reactor 4, viewed in the gas flow direction, where it reacts with the fine ores to produce directly reduced iron. The whirl layer reactors 4 to 1 are arranged in series; the reducing gas gets from one whirl layer reactor to another whirl layer reactor through connection ducts 19.

A portion of the top gas is sluiced out of the gas circuitry system 8, 17, 19 in order to avoid enrichment of inert gases, such as $N_2$. The sluiced-out top gas is fed through a branch duct 20 to the gas heater 18 for heating the reducing gas and is burnt there. Possible shortages of energy are supplemented by natural gas supplied through a feed duct 21.

The sensible heat of the reformed natural gas emerged from the reformer 10 as well as of the reformer smoke gases is utilized in a recuperator 22 to preheat the natural gas after passage through the desulfurization plant 12, to produce the vapor required for reformation and to preheat the combustion air supplied to the gas heater 18 through duct 23 as well as, if desired, also the reducing gas. The combustion air supplied to the reformer 10 through duct 24 is preheated as well.

To obtain a predetermined $H_2O$ content in the reducing gas, the reducing gas is subjected to direct cooling or direct heating in a direct cooler 25, i.e., to cooling or heating by irrigation, thus coming into direct contact with water that is cooler or hotter than the reducing gas. In doing so, the $H_2O$ content in the reducing gas decreases or increases to the point of saturation. In order to prevent condensation from taking place as the $H_2O$-saturated reducing gas is further conducted to the gas heater 18, hotter and unscrubbed top gas is fed to the reducing gas through a bypass duct 26 departing from the top-gas discharge duct 8 and running into the reducing-gas supply duct 17 before its entry into the gas heater 18. Thereby, the temperature of the reducing gas, which, for instance, has been adjusted to 70° C. in the direct cooler 25, is increased to, for instance, 75° C. The reducing gas emerging from the gas heater 18 will then have the water content that corresponds to the saturation temperature (i.e., to the temperature of the reducing gas attained in the direct cooler 25) and according to which the reduction potential of the reducing gas still can be utilized to the optimum degree, the danger of the occurrence of metal dusting being minimized nevertheless.

To further minimize metal dusting, the $CO/CO_2$ ratio of the reducing gas advantageously is adjustable to a predetermined value, which suitably is effected by feeding, for instance, reformed gas directly into the reducing-gas supply duct 17 before its entry into the direct cooler 25, through a bypass duct avoiding the $CO_2$ scrubber. In doing so, it may still be suitable to inject a partial volume of the top gas directly into the reducing gas leaving the $CO_2$ scrubber 16 likewise by means of a bypass duct 28, i.e., also in the unscrubbed state.

All of the bypass ducts 26, 27, 28 are equipped with adjustment or control valves to be adjusted or controlled on the grounds of a measurement of the $CO/CO_2$ ratio of the reducing gas taken by means of a measuring station 29.

The desired $CO/CO_2$ ratio in the reducing gas also may be adjusted by passing all of the top gas and all of the reformed gas through the $CO_2$ scrubber 16, and adjusting the latter to a wash-out level at which a portion of the $CO_2$ (and hence also a portion of the $H_2S$ absorbed by the top gas from the ore during heating of the same) will remain in the gas emerging from the $CO_2$ scrubber 16. This has the advantage that no auxiliary means, such as bypass ducts including valves, need be provided, yet requires the total gas amount, i.e., all of the top gas and all of the reformed gas, to be passed through the $CO_2$ scrubber 16, which has been dimensioned for such an amount.

The top gas leaving the whirl layer reactor 1 has an $H_2S$ content ranging between 40 and 140 ppmv, depending on the sulfur content of the ore. As pointed out above, the $H_2S$ gas forms during heating of the fine ore to reduction temperature or during the prereduction of the fine ore, respectively.

Since an elevated $H_2S$ content in the reducing gas also reduces the development of metal dusting, it is particularly advantageous if $H_2S$ no longer is completely washed out of the top gas by means of the $CO_2$ scrubber, but if it is arranged such that the percentage of $H_2S$ desired for the reducing gas be fed to the reducing gas from the top gas. In the instant case, this can be realized by means of bypass ducts 26, 28 bypassing the $CO_2$ scrubber 16, which bypass ducts depart from the top-gas discharge duct 8 and run into the reducing-gas supply duct 17. The control valves provided in the bypass ducts 26 and 28 are adjustable in a manner that an $H_2S$ content ranging from 20 to 40 ppmv, preferably amounting to about 25 ppmv, is present in the reducing gas. In that gas, the control valves preferably are activated via an $H_2S$ measuring means 30.

Figure 2:
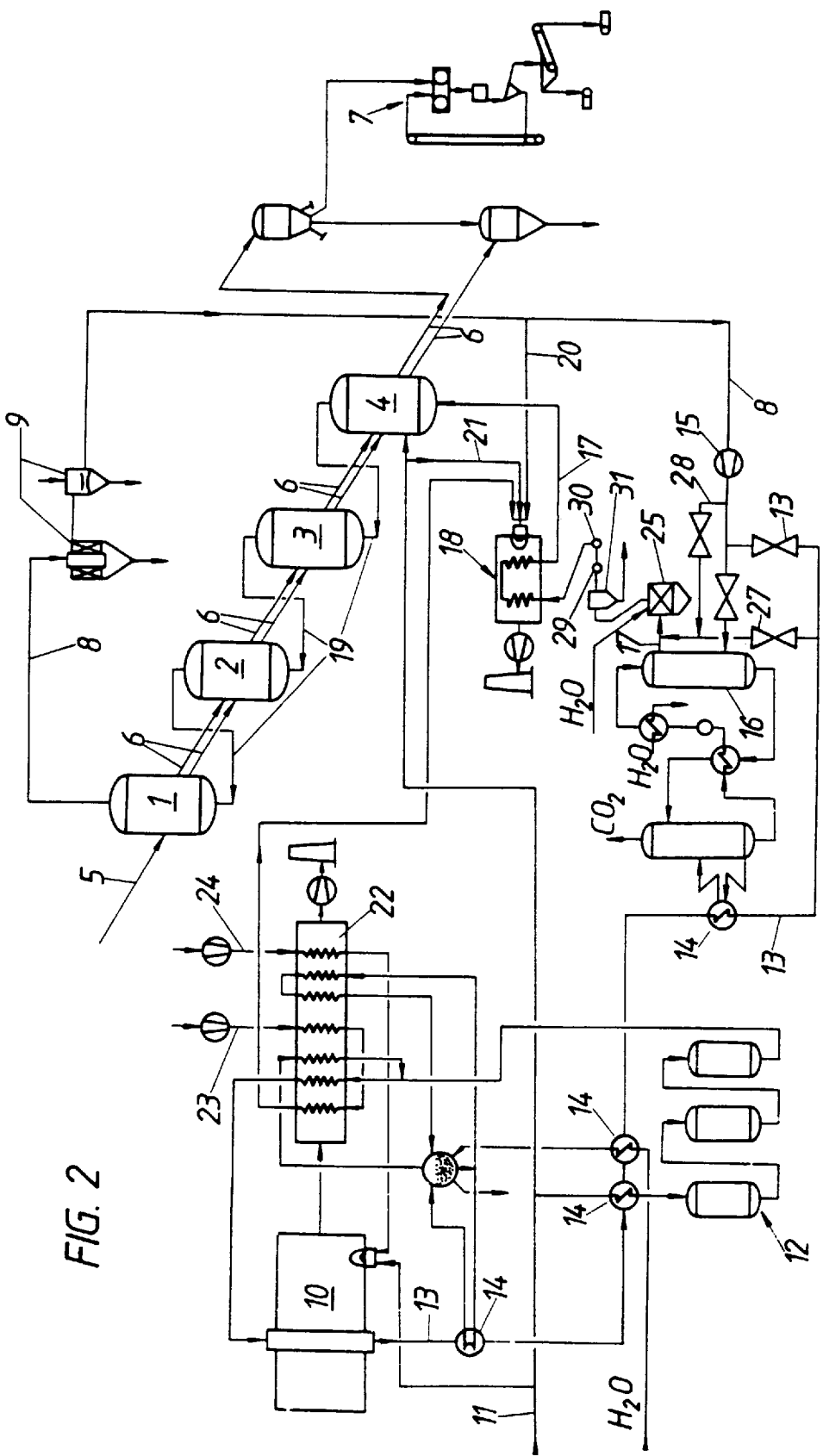
FIG. 2 illustrates an additional aspect of the process diagram according to a preferred embodiment of the present invention.

According to the embodiment illustrated in FIG. 2 of a direct reduction plant, the formation of sulfurous acid by condensation of the reducing gas emerging from the direct cooler 25 in the saturated state is prevented by passing the reducing gas through a mist eliminator 31 prior to introduction into the gas heater 18.

The measures described above for adjusting the desired $H_2O$ content, $CO/CO_2$ ratio and $H_2S$ content in the reducing gas may be taken individually or also several of them or all in common in a manner that the most favorable process variant will be available for the respective operation conditions and as a function of the composition of the ore, etc.

The adjustment of a content of $H_2O$ of 1.5% in the reducing gas is going to be explained by way of the following example:

100 t/h of dried fine ore are charged into a plant for the direct reduction of fine ore configured in accordance with FIG. 1 and designed for a production of 70 t/h of sponge iron. The fine ore has the following analysis:

Hematite 94.2%

Gangue 2.2%

Sulfur 0.02%

From the top gas forming in the direct resolution, 78,000 $Nm^3/h$ are mixed with 48,000 $Nm^3/h$ of reformed cold natural gas and passed through the $CO_2$ scrubber 16, in which the mixed gas is freed from $CO_2$ and the major portion of sulfur.

The reformed natural gas and the top gas have the chemical compositions indicated in the table below.

|  | Reformed Natural Gas | Top Gas |
| --- | --- | --- |
| $CH_4$ | 2.80 | 30.60 |
| CO | 4.80 | 5.80 |
| $CO_2$ | 14.50 | 5.30 |
| $H_2$ | 64.40 | 53.00 |
| $H_2O$ | 13.50 | 0.70 |
| $N_2$ | 0.0 | 4.60 |
| $H_2S$ | 0.0 | 60.0 ppmV |

The temperature of the reformed natural gas is 120° C., that of the top gas 100° C. The gas mixture emerging from the $CO_2$ scrubber 16 is supplied to the direct cooler 25 and cooled to a temperature of 68° C. The cooled gas mixture has the following composition:

| | |
|---|---|
| $CH_4$ | 20.70 |
| CO | 6.10 |
| $CO_2$ | 2.50 |
| $H_2$ | 65.90 |
| $H_2O$ | 1.90 |
| $N_2$ | 2.90 |
| $H_2S$ | 2 pmmV |

This gas mixture is mixed with 78,000 $Nm^3/h$ of top gas that has not been passed through the $CO_2$ scrubber 16, but has been injected into the reducing-gas supply duct 17 through bypass duct 26. Such mixing produces the reducing gas fed to the gas heater 18 and subsequently to the whirl layer reactors 1 to 4, which reducing gas has a temperature of 75° C. and the following chemical composition:

| Reducing Gas | |
|---|---|
| $CH_4$ | 24.50 |
| CO | 6.0 |
| $CO_2$ | 3.6 |
| $H_2$ | 60.90 |
| $H_2O$ | 1.5 |
| $N_2$ | 3.5 |
| $H_2S$ | 25 ppmV |

The degree of metalization ($Fe_{met}/Fe_{tot}$) of the sponge iron is 92%.

The invention is not limited to the above-described example, but is applicable also to other direct reduction processes, for instance, wherein the whirl layer reactors 1 to 4 are replaced with shaft furnaces for lumpy ore. The reformed natural gas also may be replaced with other reducing gases primarily containing CO and $H_2$, such as LD offgas;

EAF offgas;

blast furnace gas from blast furnace plants;

blast furnace gas from Corex plants;

coal gas;

Corex gas from Corex gasifier;

chemical gases.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A process for the production of a reducing gas to be used in the direct reduction of iron-oxide-containing material, wherein the reducing gas is comprised of a mixture of a synthesis gas with a top gas formed in the direct reduction process and does not crack at reduction temperature, said process comprising the steps of:

subjecting a partial volume of the top gas to $CO_2$ scrubbing, wherein the partial volume of top gas is mixed with the synthesis gas to form the reducing gas;

adjusting an $H_2O$ content in the reducing gas to a range of between about 1 and 2 Vol. % by bringing the reducing gas to a predetermined temperature by direct irrigation with $H_2O$ to saturate the reducing gas;

subsequently heating the reducing gas to a temperature above the saturation temperature of the reducing gas by admixing same with the remainder volume of the top gas which is not subjected to $CO_2$-scrubbing and which is at a temperature higher than the temperature of the reducing gas in the direct irrigation step; and using the reducing gas in the direct reduction process of the iron-oxide-containing material which results in the production of the top gas.

2. A process according to claim 1, wherein the $H_2O$ content in the reducing gas is adjusted to about 1.5 Vol %.

3. A process according to claim 1, wherein the synthesis gas is a reformed natural gas, and the process further comprises the steps of:

subjecting a partial volume of the reformed natural gas to $CO_2$ scrubbing; and bypassing the remainder volume of the reformed natural gas around the $CO_2$ scrubbing process and joining the remainder volume of reformed natural gas with the reducing gas prior to the direct irrigation step.

4. A process according to claim 1, wherein the remainder volume of the top gas which is not subjected to $CO_2$-scrubbing is joined with the reducing gas prior to the direct irrigation step.

5. A process for the production of a reducing gas to be used in the direct reduction of iron-oxide-containing material, wherein the reducing gas is comprised of a mixture of a synthesis gas with a top gas formed in the direct reduction process and does not crack at reduction temperature, said process comprising the steps of:

subjecting a partial volume of the top gas to $CO_2$ scrubbing, wherein the partial volume of top gas is mixed with the synthesis gas to form the reducing gas;

adjusting an $H_2O$ content in the reducing gas to a range of between about 1 and 2 Vol. % by bringing the reducing gas to a predetermined temperature by direct irrigation with $H_2O$ to enrich the reducing gas;

subsequently collecting any condensate which forms in the reducing gas; and using the reducing gas in the direct reduction process of the iron-oxide-containing material which results in the production of the top gas.

6. A process according to claim 5, wherein the $H_2O$ content in the reducing gas is adjusted to about 1.5 Vol %.

7. A process according to claim 5, wherein the synthesis gas is a reformed natural gas, and the process further comprises the steps of:

subjecting a partial volume of the reformed natural gas to $CO_2$ scrubbing; and bypassing the remainder volume of the reformed natural gas around the $CO_2$ scrubbing process and subsequently joining the remainder volume of reformed natural gas with the reducing gas scrubbing prior to the direct irrigation step.

8. A process according to claim 5, wherein the remainder volume of the top gas which is not subjected to $CO_2$-scrubbing is joined with the reducing gas prior to the direct irrigation step.

9. A process for the production of a reducing gas to be used in the direct reduction of iron-oxide-containing material, wherein the reducing gas is comprised of a mixture of a synthesis gas with a top gas formed in the direct reduction process and does not crack at reduction temperature, said process comprising the steps of:

subjecting at least a partial volume of the top gas to $CO_2$ scrubbing in a $CO_2$ scrubber, wherein the top gas is mixed with the synthesis gas to form the reducing gas; and adjusting an $H_2O$ content in the reducing gas to a range of between about 1 and 2 Vol. % by controlling the temperature of the $CO_2$ scrubber.

10. A process according to claim 9, wherein the $H_2O$ content in the reducing gas is adjusted to about 1.5 Vol %.

11. A process according to claim 9, wherein the synthesis gas is a reformed natural gas, and the process further comprises the steps of:

subjecting a partial volume of the reformed natural gas to $CO_2$ scrubbing; and bypassing the remainder volume of the reformed natural gas around the $CO_2$ scrubbing process and subsequently joining the remainder volume of reformed natural gas with the reducing gas.

12. A process according to claim 9, further comprising the step of bypassing a remainder volume of the top gas around the $CO_2$ scrubbing process and subsequently joining the remainder volume of top gas with the reducing gas.

13. A process according to claim 1, wherein the synthesis gas is selected from an LD offgas, an EAF offgas, a blast furnace gas, a coal gas, a gas from a gasifier, chemical gases, and combinations thereof.

14. A process according to claim 5, wherein the synthesis gas is selected from an LD offgas, an EAF offgas, a blast furnace gas, a coal gas, a gas from a gasifier, chemical gases, and combinations thereof.

15. A process according to claim 9, wherein the synthesis gas is selected from an LD offgas, an EAF offgas, a blast furnace gas, a coal gas, a gas from a gasifier, chemical gases, and combinations thereof.

16. A process according to claim 1, wherein the process is carried out in a plant comprising:

at least one direct reduction reactor for receiving the iron-oxide-containing material and reducing the same;

a $CO_2$ scrubber;

a top-gas discharge duct connecting the at least one direct reduction reactor to the $CO_2$ scrubber;

a direct cooler;

a gas heater; and a reducing-gas supply duct connecting the $CO_2$ scrubber through the direct cooler and the gas heater to the at least one direct reduction reactor;

wherein the top-gas discharge duct includes a bypass duct which bypasses the $CO_2$ scrubber and is flow-connected with the reducing-gas supply duct at a location between the $CO_2$ scrubber and the gas heater.

17. A process according to claim 16, wherein the plant further comprises:

a reformer for reforming natural gas; and a reformed-gas duct connected to the reformer and joining the top-gas discharge duct at a location such that both the reformed-gas duct and the top-gas discharge duct feed into the $CO_2$ scrubber.

18. A process according to claim 17, wherein the reformed-gas duct includes a bypass duct which bypasses the $CO_2$ scrubber and is flow-connected with the reducing-gas supply duct at a location between the $CO_2$ scrubber and the direct cooler.

19. A process according to claim 16, wherein the top-gas discharge duct further includes a second bypass duct which bypasses the $CO_2$ scrubber and is flow-connected with the reducing-gas supply duct at a location between the $CO_2$ scrubber and the direct cooler.

20. A process according to claim 5, wherein the process is carried out in a plant comprising:

at least one direct reduction reactor for receiving the iron-oxide-containing material and reducing the same;

a $CO_2$ scrubber;

a top-gas discharge duct connecting the at least one direct reduction reactor to the $CO_2$ scrubber;

a direct cooler;

a gas heater;

a mist collector; and a reducing-gas supply duct connecting the $CO_2$ scrubber through the direct cooler, the mist collector, and the gas heater to the at least one direct reduction reactor.

21. A process according to claim 20, wherein the plant further comprises:

a reformer for reforming natural gas; and a reformed-gas duct connected to the reformer and joining the top-gas discharge duct at a location such that both the reformed-gas duct and the top-gas discharge duct feed into the $CO_2$ scrubber.

22. A process according to claim 20, wherein the reformed-gas duct includes a bypass duct which bypasses the $CO_2$ scrubber and is flow-connected with the reducing-gas supply duct at a location between the $CO_2$ scrubber and the direct cooler.

23. A process according to claim 20, wherein the top-gas discharge duct includes a bypass duct which bypasses the $CO_2$ scrubber and is flow-connected with the reducing-gas supply duct at a location between the $CO_2$ scrubber and the direct cooler.

* * * * *

UNITED STATES PATENT AND TRADEMARK OFFICE
CERTIFICATE OF CORRECTION

PATENT NO. : 5,855,643
DATED : January 5, 1999
INVENTOR(S) : Gerhard Cip et al.

It is certified that error appears in the above-identified patent and that said Letters Patent is hereby corrected as shown below:

On the title page, under Item [73] Assignee, after "Voest-Alpine Industrieanlagenbau GmbH, Linz, Austria," insert --Brifer International Ltd., Bridgetown, Barbados--.

Signed and Sealed this

Twenty-ninth Day of June, 1999

Attest:

Q. TODD DICKINSON

*Attesting Officer*  *Acting Commissioner of Patents and Trademarks*